(12) United States Patent
Fraser

(10) Patent No.: US 7,096,278 B2
(45) Date of Patent: Aug. 22, 2006

(54) ELECTRONICALLY READABLE NAME TAGS FOR NETWORK COMMUNICATIONS

(75) Inventor: Alexander Gibson Fraser, Bernardsville, NJ (US)

(73) Assignee: Fraser Research, Inc., Bernardsville, NJ (US)

( * ) Notice: Subject to any disclaimer, the term of this patent is extended or adjusted under 35 U.S.C. 154(b) by 743 days.

(21) Appl. No.: 09/916,746

(22) Filed: Jul. 27, 2001

(65) Prior Publication Data

US 2003/0023763 A1 Jan. 30, 2003

(51) Int. Cl.
G06F 15/177 (2006.01)
G06F 15/173 (2006.01)
G06F 15/16 (2006.01)
H04B 1/38 (2006.01)

(52) U.S. Cl. .............. 709/245; 709/220; 709/223; 709/250; 710/8; 710/62; 455/558

(58) Field of Classification Search ........... 709/245, 709/220, 223, 250
See application file for complete search history.

(56) References Cited

U.S. PATENT DOCUMENTS

| | | | |
|---|---|---|---|
| 5,245,316 A | 9/1993 | Conner | |
| 5,699,406 A | 12/1997 | Liikanen et al. | |
| 5,790,659 A | 8/1998 | Strand | |
| 5,884,322 A * | 3/1999 | Sidhu et al. | 707/200 |
| 5,933,785 A | 8/1999 | Tayloe | |
| 6,438,643 B1 * | 8/2002 | Ohara et al. | 711/103 |
| 6,629,149 B1 * | 9/2003 | Fraser et al. | 709/245 |
| 6,687,707 B1 * | 2/2004 | Shorter | 707/103 R |
| 6,754,321 B1 * | 6/2004 | Innes et al. | 379/201.03 |
| 2003/0001012 A1 * | 1/2003 | Bermudez | 235/454 |

FOREIGN PATENT DOCUMENTS

| | | |
|---|---|---|
| EP | 0 853 402 A2 | 7/1998 |
| EP | 1 059 791 A | 12/2000 |
| WO | WO-01/33387 A2 | 5/2001 |

OTHER PUBLICATIONS

Microsoft Windows 2000 Professional Unleased, Chapter 17, enclosed pages labled p. 1 to 9., Publisher: Sams Publishing, Pub Date: Feb. 14, 2000, ISBN: 0-672-31742-7.*

(Continued)

Primary Examiner—Fritz Fleming
Assistant Examiner—Alan S. Chen
(74) Attorney, Agent, or Firm—Lerner, David, Littenberg, Krumholz & Mentlik, LLP

(57) ABSTRACT

An improved method of addressing devices in a local area network is disclosed. A small plug-in tag may be added to each device on the network. The tag is given an easily remembered name provided by the user. In addition the tag can be given a pictorial icon which can be represented by a moderate number of bits. The name and the optional icon may be visible on a label on the tag. The tag contains a chip with a small memory into which the name and optionally the bit map representation of the icon is entered. In addition, an optional unique identifier may be entered. Pins on the tag are connected to the device which has its own network address, such as an Ethernet address. Optionally, the network address may be copied into the unique identifier, or the unique identifier may be copied into the network address. The use of the tag permits easy configuration and reconfiguration of the network. The invention is particularly applicable in home or small office networks where computer-knowledgeable persons are not available to perform configuration functions.

29 Claims, 3 Drawing Sheets

OTHER PUBLICATIONS

Telestial Inc., SIM History, Web Article, Unknown, 4 pages.
Telestial Inc, GMS Tutorial: Step By Step GSM World Phones Airtime Voucher/Top Up Card SIM Cards, Web Article, Unknown, 6 pages.
Stephen A. Thomas, "IPng and the TCP/IP Protocols: Implementing the Next Generation Internet", pp. 132-137.
"Inside AppleTalk" Second Edition, Apple Computer Inc., 1990., pp. 7-4 through 7-17.
"An Ethernet Address Resolution Protocol," by David C. Plummer, IETF, Network Working Group, Request For Comments: 826, Nov. 1982, 14 pages.
Microchip, 24LC01B/02B, specification, Microchip Technology Incorporated, 20 pages.
"Inside Macintosh Networking," Chapter 3, Name-Binding Protocol (NBP), Apple Computer, Inc. 1994, 3-3 through 3-48, 48 pages.

* cited by examiner

EXPLODED VIEW

ELECTRONICALLY READABLE NAME TAGS FOR NETWORK COMMUNICATIONS

BACKGROUND OF INVENTION

The present invention relates to the networking of devices, in particular to methods by which devices are addressed in a local area network.

In a communication network such as a local area network (LAN), devices communicate with each other by sending digital messages. Devices may include printers, storage units, computers, controllers, and others. A typical LAN is one conforming to Ethernet standards. See, e.g., IEEE 802.3 Carrier Sense Multiple Access with Collision Detection (CSMA/CD) Access Method and Physical Layer Specifications, and related standards. When more than two devices are present, it is necessary that each device be addressable so that messages may be directed to it. A network address is commonly entered into a device during its manufacture, in particular into an interface card of the device. The address is generally unchangeable. It may be considered to be analogous to a serial number, in that at least ideally no two devices have the same address. However the uniqueness of addresses is difficult to enforce, and typically some devices somewhere will have a common address. In an Ethernet application, the network address is a 48-bit sequence which does not correspond to any name that can be readily remembered by a user. Any device on the Ethernet network that wishes to send a message to another device uses that other device's network address as the destination part of the message header.

A key process that must take place upon initial set-up of the network or upon reconfiguration is the learning of the addresses of all devices that may participate in communications. When new devices are installed on a network, it is necessary for each device, including those previously installed, to ascertain the network addresses of the devices with which it communicates. It is also highly desirable to be able to assign easily remembered names to the devices. One particular computer on the network typically begins the process by issuing a request message using a global address, or a partially global address to devices of a particular type, such as all printers or printers of a particular type. All devices that recognize that address respond giving, among other information, their network addresses. After the computer receives the network addresses of all new devices, the user of that computer then assigns names to each device. A message is sent to each new device giving its assigned name, and that name is stored in a register in the device. A translation is entered in the originating computer so that future references to a user assigned device name causes that device's network address to be entered as destination into the header of messages to that device. For subsequent operations of this address discovery process, each device returns its assigned name along with the network address.

In Ethernet networks controlled by an Apple computer, address discovery is performed by the Name Binding Protocol [G. S. Sidhu, R. F. Andrews, and A. B. Oppenheimer, "Inside Apple Talk", Addison-Wesley, 1990, pp. 7-4 to 7-17]. Here the name includes three fields, and generic or global values are permitted in each. One field is the name itself. Another field is the device type. The final zone field is set to a null value for a simple Ethernet network. The protocol begins with a message with a global name and either global or specific type. All devices that satisfy that specification respond, giving their addresses. The next step in the process is a message to each device giving it its assigned name. That name is then entered into the memory of the device. Subsequent replies to address discovery messages include the name in addition to the address. A somewhat similar procedure is performed in networks using the Internet Protocol (IP) by the Address Resolution Protocol [S. A. Thomas, "IPng and the TCP/IP Protocols", John Wiley & Sons, 1995, pp. 132–137]. See, e.g., D. Plummer, "An Ethernet Address Resolution Protocol," IETF Network Working Group, RFC 826 (November 1982).

The current procedures for address administration as described above may cause difficulties, particularly for users who are not adept at computer operations. This is especially likely to be true in a home or small business environment. The user operations necessary to assign and distribute device names are difficult ones. A further problem arises when a device is moved to a different location and it is desired to change that device's name to correspond to the new location. The user must again go through the difficult procedure of name assignment. If the user neglects to do this, as is likely, then the device will retain its previous name, which may now indicate a wrong location.

An additional problem arises when network addresses are not unique. This is particularly serious in a mobile network, or when the local area network is connected to a global network, such as the Internet, where addresses are expected to be unique globally.

SUMMARY OF INVENTION

An improved method of addressing devices in a network is disclosed. In accordance with an aspect of the invention, an electronically readable name tag is plugged into each addressable device on the network. The tag includes a chip whose memory contains at a minimum the name that the user has assigned to the device. That name can advantageously be visibly printed on the front of the tag. The memory may also contain a unique identifier. During any operation of the address discovery procedure, including the initial one, the device responds with its assigned name and either its unique identifier or the network address manufactured into the device. A computer on the network then can create a translation table of assigned names and corresponding unique identifiers or network addresses without the user having to perform a difficult address assignment procedure. To rename devices, for example when they are physically moved, it is only necessary to move the name tags which automatically activates the address discovery process.

In addition to an alphanumeric name, the name tag can also include a bit-mapped representation of a pictorial icon in its memory. That icon would then appear pictorially both on the tag and the display of the user's computer.

In another embodiment of the tag, it can be produced so that the name or icon is not visible on the tag. This embodiment of the tag is especially applicable when the device is already equipped with a display. The name and optionally the icon stored in the tag's memory can be caused to appear on that display.

The unique identifier may be entered into the tag's memory by an agent who is assigned such identifiers by a licensing authority. Alternatively the identifier could be obtained by communicating with that authority. Further options include copying the network address into the unique identifier, or copying the unique identifier into the network address.

These and other advantages of the invention will be apparent to those of ordinary skill in the art by reference to the following detailed description and the accompanying drawings.

DETAILED DESCRIPTION

Figure 1:
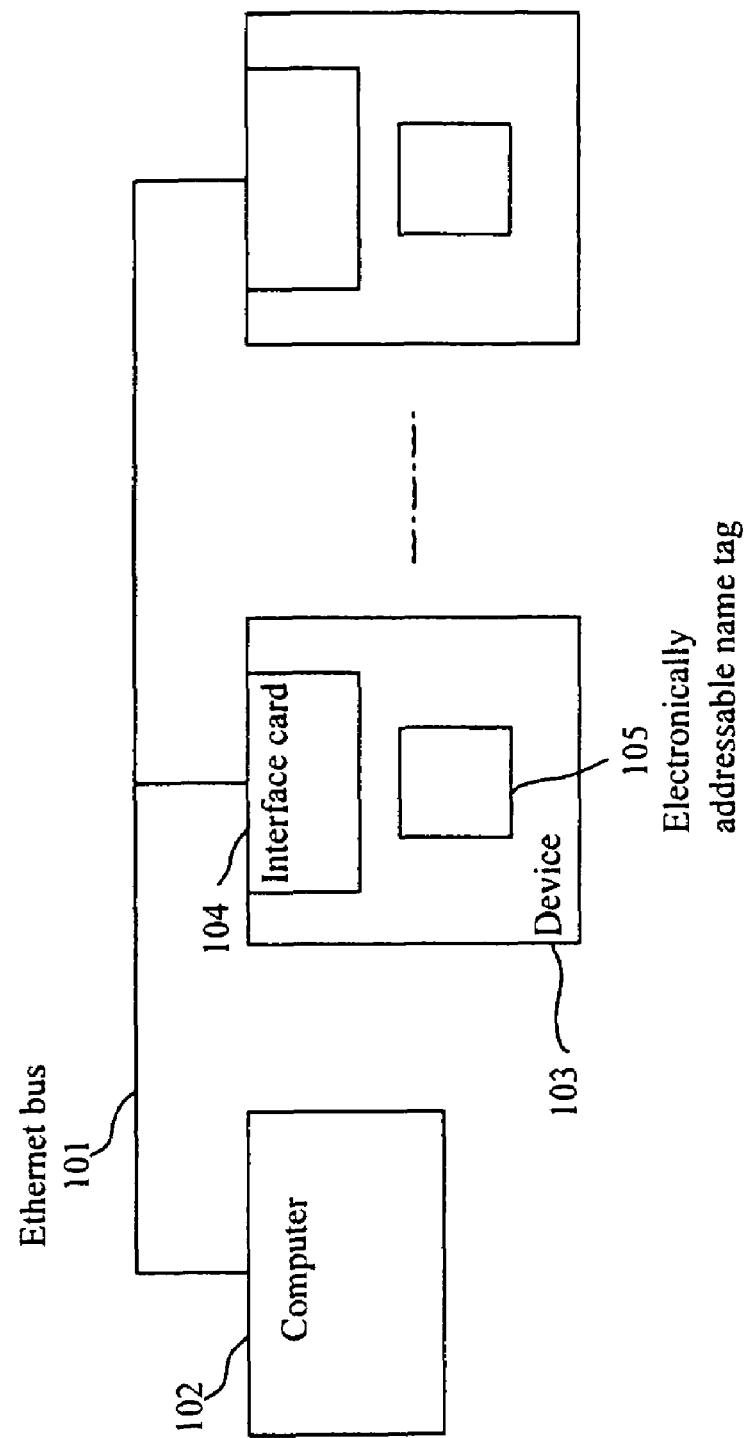
FIG. 1 illustrates a local area network using a bus type architecture such as in Ethernet, in which the present invention may be applied.

In order to illustrate the environment in which the present invention functions, FIG. 1 shows the configuration of a simplified local area network arranged as a bus structure, as in the basic version of Ethernet. Although the invention shall be described in detail herein in the context of Ethernet and the protocols associated therewith, one of ordinary skill in the art would readily recognize that the invention is not limited to Ethernet or a particular network topology. It should be understood that the invention is applicable in other types of networks, for example those arranged in a star type configuration, as is also common in Ethernet networks. The illustrative example of FIG. 1 includes a computer 102 and other devices 103 that communicate over the Ethernet bus 101. Each of the devices includes an interface card 104 into which the manufacturer has entered a network address of 48 bits that ideally differs from the unique address of any other device anywhere. In the prior art, the device may also contain memory for storing a name assigned by the user.

In accordance with a preferred embodiment of the present invention, the device is modified so as permit the insertion of an electronically addressable name tag 105, e.g. by means of connector pins. It is anticipated that in the future devices will be produced with sockets to accommodate such name tags. Before that occurs, a plug-in socket may be mounted in any convenient manner to an existing device, and the pins of that sockets wired to a standard interface such as a serial interface of the device.

Figure 2:
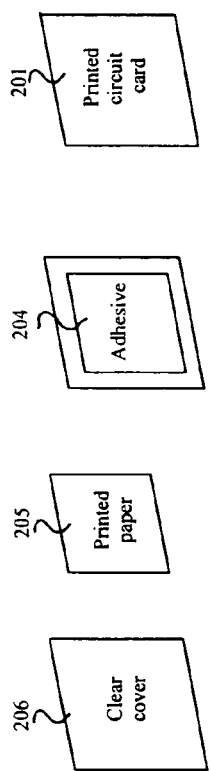
FIG. 2 shows three views of a possible physical implementation of the electronically readable name tag with a visible label.
Figure 2:
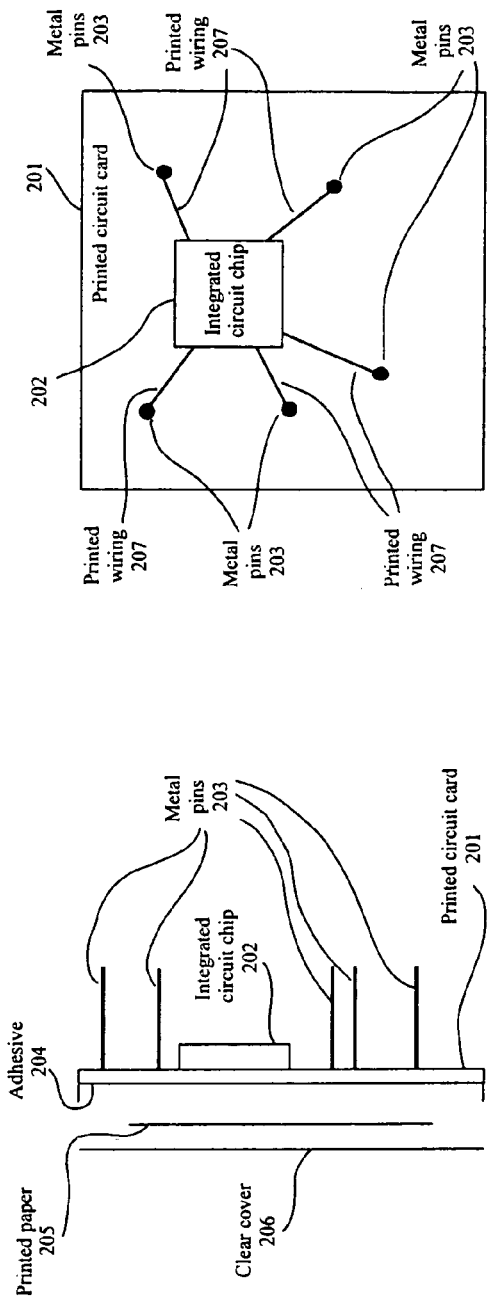

Three views of an illustrative physical embodiment of the electronically readable name tag is shown in FIG. 2. The small printed circuit board 201 is approximately a 1.5 inch square. An integrated circuit chip 202 is mounted on the rear side of the board and wired to five metal pins 203 by means of printed wiring 207 on the circuit board. The pins connect with circuitry on the device, or as mentioned above to the serial interface of the device. Two pins supply the chip with a voltage supply and a common ground connection. One pin is used to receive a clock signal from the device. The fourth pin carries the data to be read or written to the chip. The fifth pin enables the write operation. The integrated circuit chip 202 may be without limitation a 24LC02B Serial Programmable Read Only Memory produced by Microchip Technology Inc., which provides 2048 bits of memory. The specification sheets for that chip describe its functions and gives detailed instructions for writing and reading information into and out of the chip. In order to be able to add labeling easily, the rim of the front of the printed circuit board can be coated with a soft adhesive 204. A printed piece of paper 205 is placed within the frame created by the adhesive. That paper displays the assigned name and/or the pictorial icon which may serve as a name. Finally a clear plastic cover 206 can be placed over the paper and held in place by the adhesive. This cover protects the printed paper from normal wear.

Figure 3:
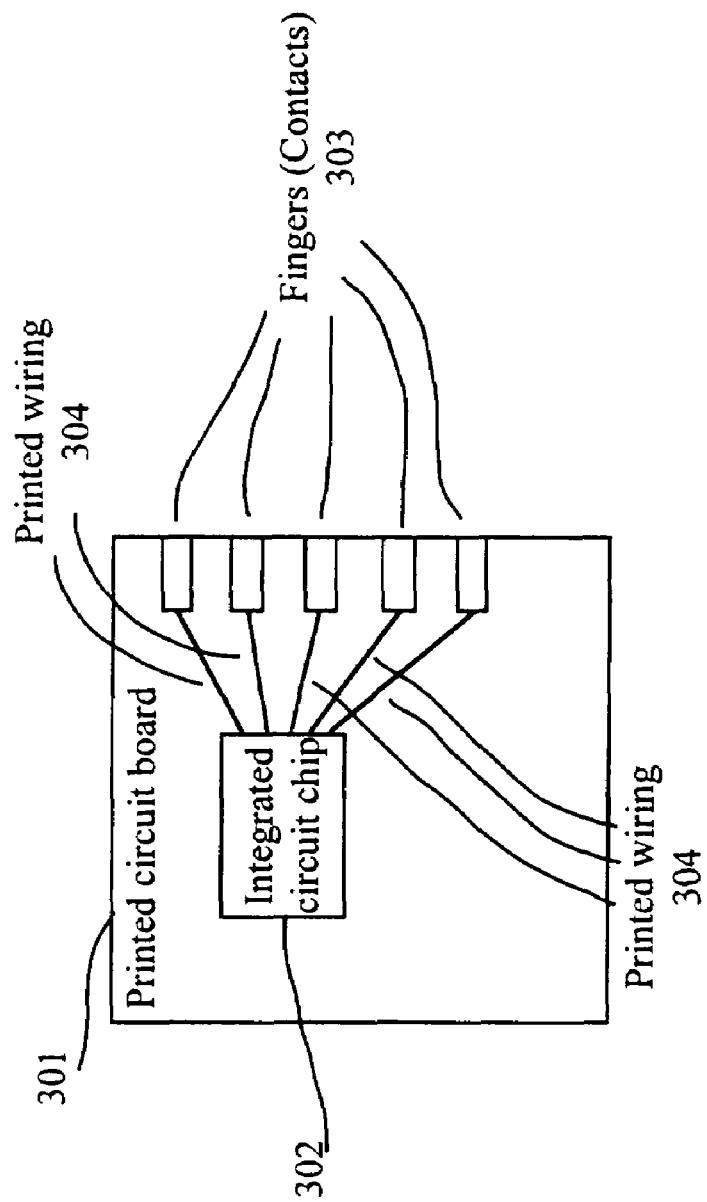
FIG. 3 shows an alternative physical implementation of the tag for edge-wise insertion, in which no visible label is provided.

As an alternative, the tag may be designed to be inserted edgewise. Such an arrangement is shown in FIG. 3. As in the previous arrangement, a printed circuit card 301 has an integrated circuit chip 302 mounted on it. The chip is connected by means of printed wiring 304 to five fingers 303 printed on the board. These fingers connect to circuitry on the device and provide the same functions as the pins previously described. In this case there is no visible printed display on the tag. Instead the device may read the name and optionally the icon and display them on an electronic display on the device. The chip that is mounted on the tag contains memory which holds the assigned name. That stored name can be the ASCII representation of the assigned name, one byte per character. If the assigned name includes a pictorial icon, a bit-mapped representation of that icon is also advantageously stored. For a black and white icon displayed as 1024 pixels (32 by 32) with one bit per pixel, 1024 bits of storage would be needed. It is advantageous that the memory of the chip also contains a unique identifier. That unique identifier may be installed in the name tag during manufacture. More likely, after purchase, the customer or an agent, such as a retail store, would enter the name and icon into the tag's memory, and also print and install the paper label, if any. The agent may be assigned unique identifiers by a licensing authority.

It is possible that a knowledgeable customer, possessing the appropriate equipment, could perform this function. In this case, the unique identifier could be obtained by communicating with a licensing authority. It is possible that the device itself may be capable of writing into the memory of the chip. If such a mode of operation is not used, then the write-enable pin of the tag is not electrically connected to the device.

The unique identifier that is entered in the name tag memory could be the same as the network address of the device, copied into the tag. That address may be augmented by additional bits. Alternatively, the unique identifier could be a fixed string entered into the memory at the same time as the name. In the future, the network address in a device may not be permanent, and the unique identifier in the tag could be copied into that address.

After a new device is added to the network, with its tag plugged in, an address discovery procedure is automatically commenced. All devices on the network receive an initialization message using a global address. Alternatively a partially global address, specifying devices of a particular type, may be invoked. All devices attempt to respond by giving their assigned names and either the unique identifiers in their tags or the network addresses that were entered into the interface cards by their manufacturer. After all responses are all received by initiating computer, that computer uses the responses to create or modify a translation table between assigned names and their corresponding unique identifiers or network addresses. The computer subsequently displays the assigned names, which may be in text form or pictorially corresponding to the bit mapped descriptor of an icon stored in the tag.

For subsequent communication, when the user wished to communicate with a device, the user selects the name or icon on the screen of the computer. The translation table in the computer then causes a message to be sent with the header containing the computer's address as originator and the device's unique identifier in its name tag or its network address as destination. Only that device will accept the message. Messages from a device include a header with that device's unique identifier or network address as originator and the appropriate destination address.

At some later time, it may be desired to change the assigned names of one or more devices. For example, the name may refer to the location of the device and the device is to be moved. This name change is accomplished simply by removing the name tag and inserting another. The computer then repeats the name acquisition process and the new name becomes available for use.

In another scenario, it may be desired to replace a particular device with a new one while transferring the device name and unique identifier to the new device. In this case it is only necessary to move the tag.

The name tag is the only thing that a user needs to be aware of when connecting a new device to the network, removing a device from the network, or identifying a device already on the network. There is no need for a central database to be administered and no special server without which the network is unusable.

The user does not need to learn or even know about unique identifiers or network addresses for any devices; nor does the user need to perform any address assignment function. Furthermore, these advantages can be realized even when a device moves from one place to another.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

The invention claimed is:

1. An electronically readable name tag for labeling a device, the name tag comprising:
    a memory for storing a user assignable name for labeling the device, the user assignable name being displayed on an exterior surface of the name tag; and
    an interface for connecting the name tag to the device, the interface being adapted to allow the user assignable name to be visible when the name tag is connected to the device, and
    wherein when the interface is connected to the device, the user assignable name is read from the memory by the device and utilized by the device in communications across a network.

2. The name tag of claim 1, wherein the user assignable name comprises an alphanumeric name.

3. The name tag of claim 1, wherein the user assignable name comprises a pictorial icon.

4. The name tag of claim 3, wherein the pictorial icon is displayed on the exterior surface of the name tag.

5. The name tag of claim 1, wherein the associates the user assignable name with an address on the network.

6. The name tag of claim 1, wherein the memory also stores a unique identifier.

7. The name tag of claim 6, wherein the unique identifier may be utilized as a network address in the network.

8. The name tag of claim 6, wherein the unique identifier is obtained from communications with a remote database.

9. The name tag of claim 1, wherein the device further comprises a display capable of displaying a network address stored in the memory of the name tag.

10. The name tag of claim 1, wherein the interface further comprises a connector which can be plugged into an interface on the device.

11. The name tag of claim 10, wherein the interface of the name tag is adapted to be connected to a serial interface on the device.

12. The name tag of claim 1, wherein the network is an Ethernet network.

13. The name tag of claim 1, wherein when the name tag is physically moved and connected to another device the user assignable name is loaded into the another device and utilized by the another device in communications across the network.

14. A method of addressing a device resident on a network, comprising:
    storing a user assignable name in an electronically addressable tag;
    affixing the electronically addressable tag to a surface of the device such that the user assignable name is visibly apparent;
    establishing an electronic connection between the device and the electronically addressable tag;
    loading the user assignable name stored in the electronically addressable tag into the device via the established electronic connection; and
    configuring the device to utilize the name in communications across a network.

15. The method of claim 14, wherein the step of configuring the device further comprises the step of storing an association between the user assignable name and a network address for the device in a translation table.

16. The method of claim 15, wherein the address for the device is also stored in the electronically addressable tag.

17. The method of claim 14, wherein the name comprises an alphanumeric name.

18. The method of claim 14, wherein the name comprises a pictorial icon.

19. The method of claim 14, wherein the network is an Ethernet network.

20. The method of claim 14 further comprising:
    moving the electronically addressable tag from the device to another device
    establishing an electronic connection between the another device and the electronically addressable tag;
    loading the user assignable name stored in the electronically addressable tag into the another device; and
    activating an address discovery process that configures the another network device to use the user assignable name in communications across the network.

21. The method of claim 20, wherein activating further comprises associating the another device with a unique identifier that identifies the another device on the network.

22. A method for use with one or more devices that are addressable on a network, comprising:
    generating a user assignable name which may be utilized by the devices in communications across the network;
    storing the user assignable name in a tag as a digital representation of a pictoral icon that is displayed on the tag's exterior;
    affixing the tag to a first device from among the one or more devices such that the user assignable name is visually apparent on the first device;
    downloading the user assignable name from the tag to the first device through an electronic connection between the tag and first device; and
    utilizing the user assignable name to configure the first device for communications across the network.

23. The method of claim 22, wherein the name comprises a digital representation of an alphanumeric name.

24. The method of claim 22 further comprising: removing the tag from the first device; physically connecting the tag to a second device; and initiating, by the second device, a procedure to discover user assignable names associated with at least a third device of the one or more addressable devices connected to the network.

25. The method of claim 24 further comprising establishing a record that associates the user assignable names with the one or more devices connected to the network.

26. The method of claim 24 further comprising displaying the discovered user assignable names to a user.

27. An electronically readable name tag for labeling one or more addressable devices on a network, the name tag comprising:
- a memory for storing a user assignable name and a unique identifier associated with a first device of the one or more addressable devices; and
- a connector for removably connecting the name tag to the first device, the device being adapted to accommodate the name tag such that the user assignable name is visibly displayed when the name tag is connected to the first device, and wherein the user assignable name is read from the memory by the first device and used to configure the first device for communications over the network.

28. The electronically readable name tag of claim 27, wherein the first device uses the user assignable name and unique identifier to configure the first device for communications over the network.

29. The electronically readable name tag of claim 27, further comprising a second device, the name tag being removed from the first device and connected to the second device and wherein the user assignable name is read from the memory by the second device and used to configure the second device for communications over the network.

* * * * *

UNITED STATES PATENT AND TRADEMARK OFFICE
CERTIFICATE OF CORRECTION

PATENT NO. : 7,096,278 B2  
APPLICATION NO. : 09/916746  
DATED : August 22, 2006  
INVENTOR(S) : Alexander G. Fraser It is certified that error appears in the above-identified patent and that said Letters Patent is hereby corrected as shown below:

Column 5, line 54, after "the" (second occurrence) insert --device--.

Signed and Sealed this

Nineteenth Day of June, 2007

JON W. DUDAS  
*Director of the United States Patent and Trademark Office*